Aug. 26, 1941.  A. A. KOTTMANN  2,254,105
SLICING MACHINE
Filed April 23, 1938  3 Sheets-Sheet 1
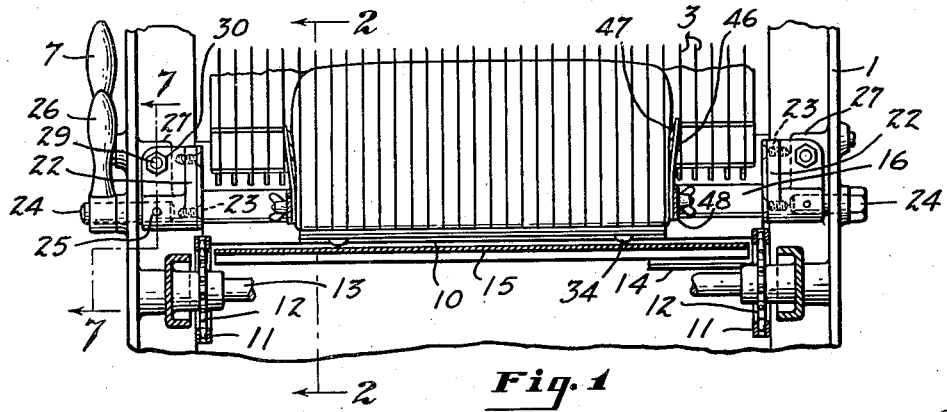
Fig. 1
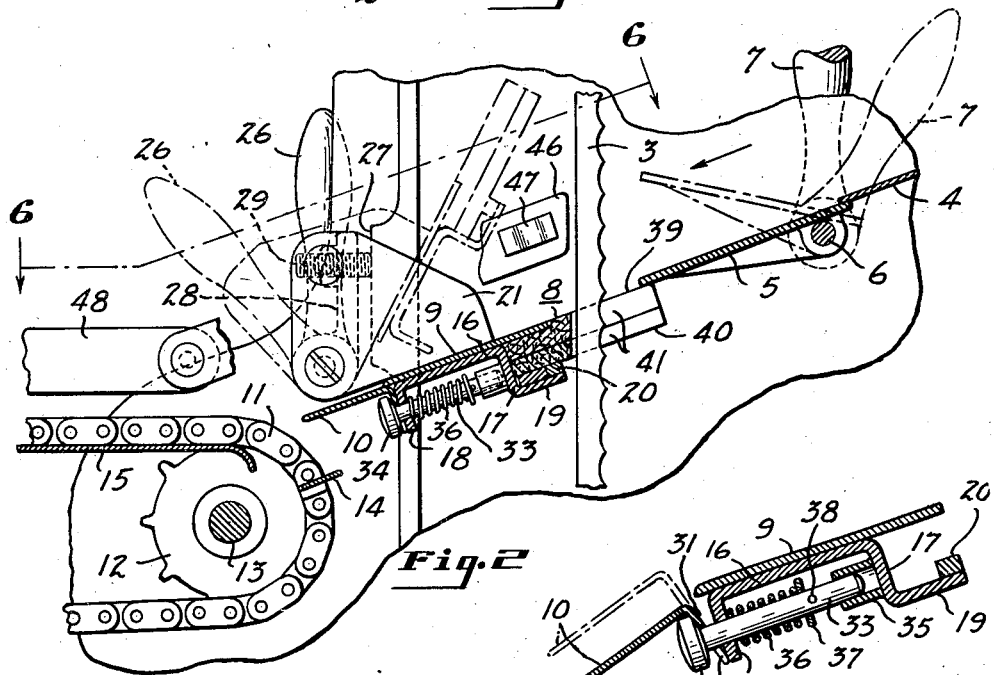
Fig. 2
Fig. 3
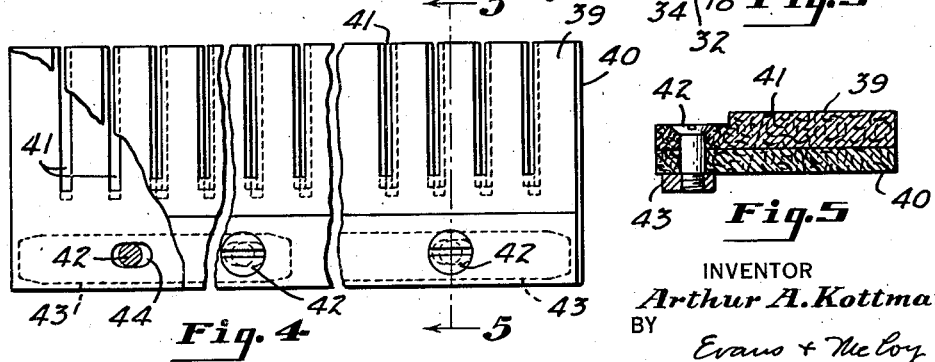
Fig. 4
Fig. 5
INVENTOR
Arthur A. Kottmann
BY
Evans + McCoy
ATTORNEYS Aug. 26, 1941.    A. A. KOTTMANN    2,254,105
SLICING MACHINE
Filed April 23, 1938    3 Sheets-Sheet 2

INVENTOR
Arthur A. Kottmann
BY
Evans & McCoy
ATTORNEYS

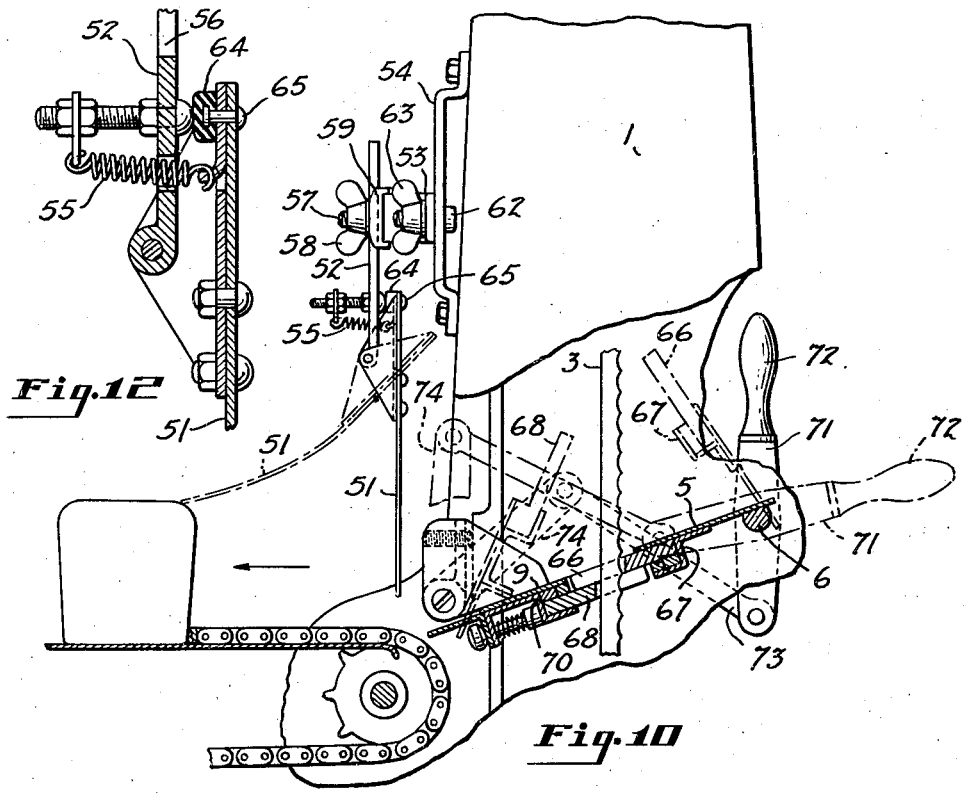
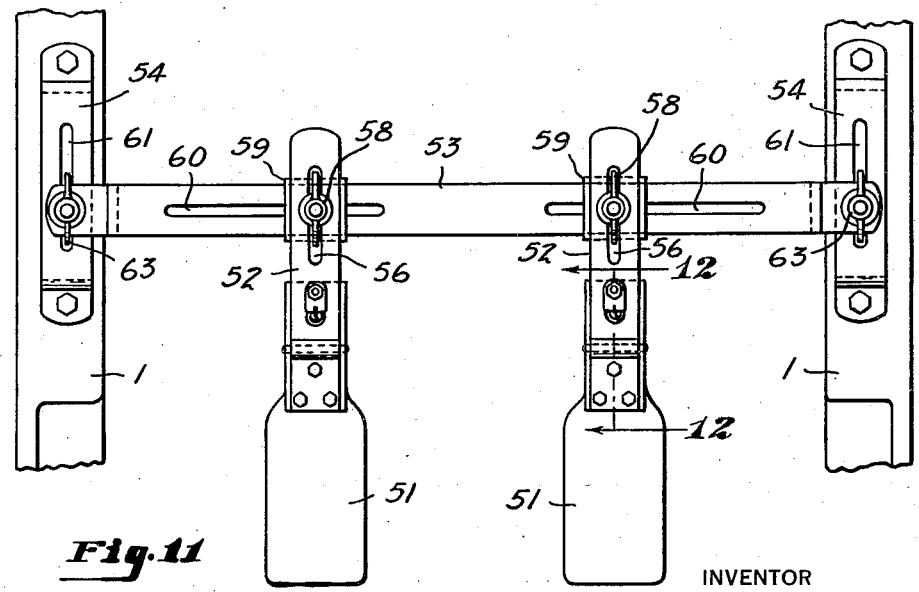

Patented Aug. 26, 1941

2,254,105

UNITED STATES PATENT OFFICE 2,254,105

SLICING MACHINE

Arthur A. Kottmann, Davenport, Iowa, assignor to Micro-Westco, Incorporated, Bettendorf, Iowa, a corporation of Delaware Application April 23, 1938, Serial No. 203,864

4 Claims. (Cl. 146—153)

This invention relates to slicing machines and more particularly to slicing machines for commercial slicing of bread and other bakery products.

It is desirable to provide a slicing machine which may be converted so that bakery products may be sliced in several slice thicknesses. One way of obtaining varied slice thicknesses on the same slicing machine is to substitute separate sets of blades for the machine having the desired blade spacing. This requires a change of blade frames and in order to change these frames readily it is advantageous that the space adjacent the blade frames be clear and unobstructed. However, since the slicer blades are thin and relatively long it is also advantageous to provide suitable blade guides to keep the blades properly spaced and facilitate the cutting of uniform slices.

It is an object of this invention to provide a slicer which is readily convertible for any slice thickness.

Another object is to provide an improved blade guide mechanism such that the blade guides may be readily interchanged for any change in the distance between blades.

A further object is to provide an article support to support the article at the time it is being sliced but which may be easily moved out of the way when a change of blade frames is desired.

Another object is to provide a slicing unit in which small heel slivers, crumbs and the like may be removed from the slicing mechanism.

Another object is to provide interchangeable heel sliver and crumb dispensers for various loaf lengths.

Other objects and advantages will become apparent from the following detailed description and the accompanying drawings, in which:

Figure 1 is an end elevational view partly in section taken from the discharge end of the slicer showing a sliced loaf in passage through the machine;

Fig. 2 is a sectional view taken substantially on the line 2—2 of Fig. 1 showing a pivoted holding member in its two operative positions;

Fig. 3 is an enlarged sectional view of the holding member and article support showing the heel sliver or crumb dispenser plate and how it may be removed;

Fig. 4 is a plan view partly in section of the interchangeable blade guide;

Fig. 5 is a cross-sectional view taken substantially on the line 5—5 of Fig. 4;

Fig. 10 is a sectional view showing a modified form of mounting for the cutter or blade guides;

Fig. 11 is an elevational view, looking in the same direction as in Fig. 1, illustrating the article control gate; and Fig. 12 is a sectional view taken substantially on the line 12—12 of Fig. 11.

Figure 6:
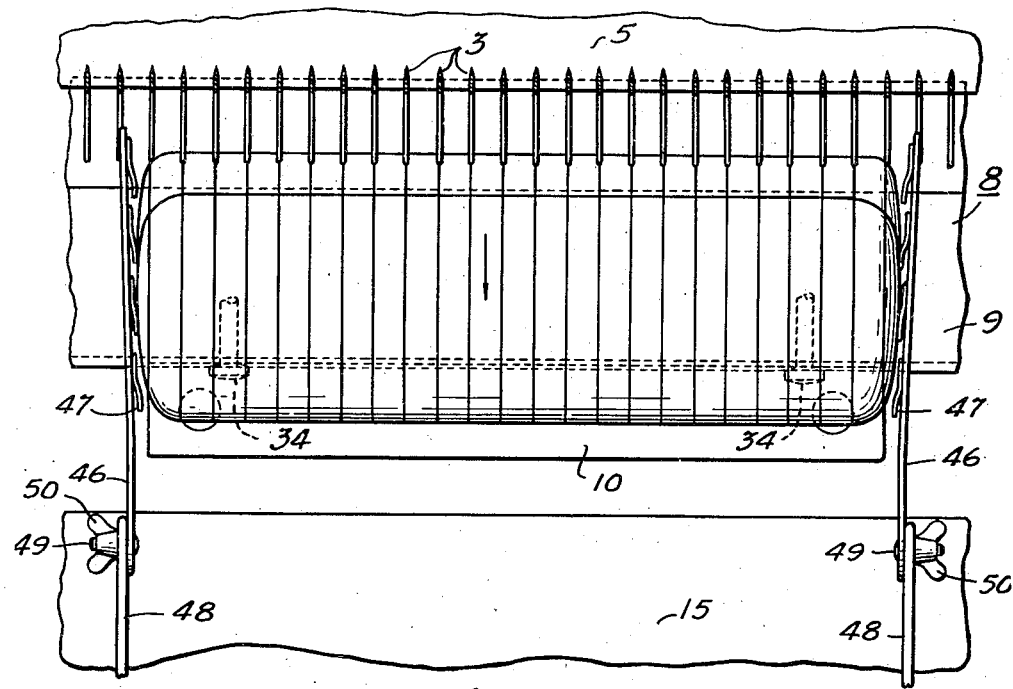
Fig. 6 is a plan view of the mechanism shown in Fig. 1, taken substantially on the line 6—6 of Fig. 2.

Referring to the drawings, in which like parts throughout the several views are indicated by the same numerals of reference, it is seen that the slicing mechanism comprises a pair of side frames 1 in which are mounted for reciprocation in a well known manner, blade frames (not shown) carrying a plurality of spaced cutters or blades 3. The articles to be sliced may be fed in by a suitable infeed conveyor, a portion of which is shown at 4. From the infeed conveyor the articles are fed to a transfer table 5 which is pivotally mounted in the side frames and is arranged to be swung about the pivots 6 by means of a handle 7. From the transfer table 5 the articles are fed through the blades 3 and while they are being sliced the articles are supported by the blade guide mechanism 8 and a table or article support 9. As the loaves leave the article support 9 they pass over a supplemental or additional article support 10 and onto a conveyor. The conveyor may be a discharge conveyor from the slicer or an infeed conveyor to a suitable wrapping machine. The conveyor may be of any suitable type, and as shown, comprises two spaced endless chains 11 carried by sprockets 12 which are keyed to a rotatable shaft 13. The chains of the conveyor also carry a series of spaced flights 14 which serve to advance the sliced articles over a conveyor table 15.

To mount the blade or cutter guides so that they may be rotated to a position where they will not interfere with a change of blade frames a holding member 16 is provided, disposed beneath and securely fastened to the article support 9. However, it is to be understood that the article support 9 may be an integral part of the holding member 16.

The holding member, indicated generally by the numeral 16, comprises a transverse channel shaped member having two depending flanges 17 and 18. The flange 17 carries an outwardly extending shelf 19 substantially parallel to the article support 9. The shelf 19 at its free end may be provided with a plurality of upstanding locking lugs 20 which cooperate with the shelf 19 and the support 9 to engage and retain the blade guide element 8 as will be described.

In order that the holding member 16 may be rotatably mounted each end thereof is provided with upwardly projecting mounting ears 21 which may be secured to brackets 22 by means of suitable screws or bolts 23. The brackets 22 are pivotally mounted to the side frame by means of stub shafts 24 journalled in the side frames 1 and the outer ends of the stub shafts 24 may be shaped to receive a suitable wrench or handle 26 for rotation. Each of the brackets 22 is keyed to the stub shaft 24 as shown at 25, so that when a suitable crank or wrench 26 is placed on the stub shaft 24 and rotated the brackets 22 will rotate, carrying with them the mounting ears 21 and the holding member 16.

Figure 7:
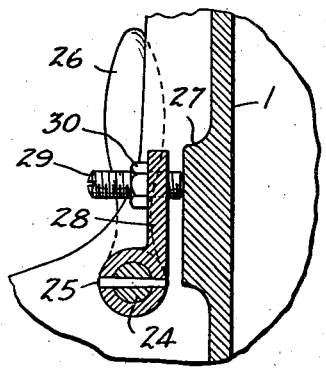
Fig. 7 is a view taken substantially on the line 7—7 of Fig. 1 showing a detail of the adjustment for the pivoted blade guide member.
Figure 8:
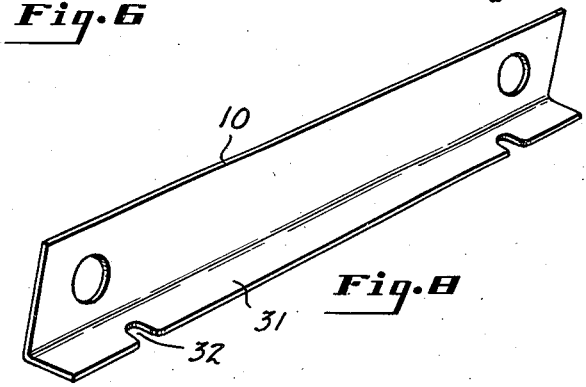
Fig. 8 is a view in perspective of the removable heel sliver and crumb dispenser plate.
Figure 9:
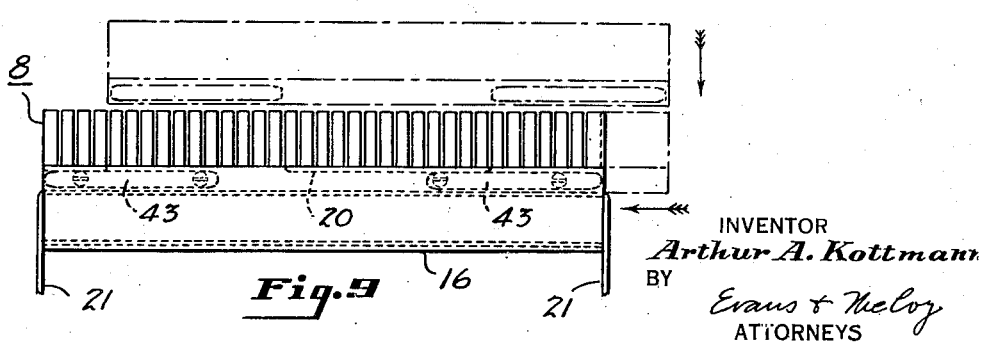
Fig. 9 is a plan view of the holding member illustrating the method of inserting the blade guide element.

Since it is desirable that the article support and the blade guide be held in position during the slicing operation, rotation of the holding member may be prevented in the following manner. The side frame 1 is provided with a boss 27 disposed at approximately the height of the stub shaft 24 as shown in Fig. 7. The bracket 22 carries an upwardly extending flange 28 which is provided with a drilled and tapped hole to receive a set screw 29 which may be locked by a nut 30. When the holding member 16 is in its operable position the set screw 29 is adjusted so that it abuts the boss 27. Then the nut 30 may be tightened so that the bracket 22 is held against further rotation in a clockwise direction, looking at Fig. 7. Counter-clockwise motion may be prevented by locking the transfer table 5 in operating position and in contact with the guide element 39.

It has been found advantageous to dispose of the crumbs and small heel slivers obtained in the slicing of bakery products and for this purpose an additional article support or crumb and heel sliver dispenser plate 10 is provided which may be resiliently mounted on the holding member 16 adjacent the flange 18. The plate 10 has a flange 31 which is substantially perpendicular to the plane of the article support and is provided with slots 32 by means of which it may be mounted. The plate 10 is mounted so that the flange 31 abuts the flange 18 of the holding member 16 and is held thereto by the action of a spring. A suitable bolt 33 is provided with a head 34 having its mean diameter greater than the width of the slot 32 so that when the plate 10 is mounted on the holding member 16 the shank portion of the bolt 33 extends through the slot 32 through an aperture in the flange 18 and across the space between the flanges 18 and 17 of the member 16 toward the flange 17. Disposed on the flange 17 is an annular socket 35 arranged to receive the free end of the bolt 33. The bolt 33 also carries a helical spring 36 which is partially compressed by an annular washer 37. A pin 38 extends through the shank of the bolt 33 to limit movement of the washer 37 and the spring 36 and to prevent axial movement of these parts beyond the pin toward the free end of the shank. The plate 10 may be removed by inserting fingers through finger-holes and drawing the plate outwardly and slightly downwardly away from the flange 18 as shown by the full lines in Fig. 3, thereby compressing the spring 36. In this way the plate 10 may be readily removed and replaced by other plates of varying length so that they may be used to dispose of crumbs and heel slivers from articles of any length.

To provide for a desirable transfer of the sliced articles from the article support 10 to the discharge conveyor and prevent the sliced articles from tipping and falling onto their sides the mechanism shown in Figs. 10 to 12 may be employed. This mechanism consists of a pair of flexible flat blade or paddle members 51 pivotally mounted to the frame and projecting into the path of the sliced articles, so that they are held on the article support 10 until advanced therefrom by the next succeeding article. The blades or paddles 51 are pivotally connected to links or arms 52 which are adjustably mounted on a cross bar 53, which is, in turn, adjustably secured at its extremities to a pair of supports or brackets 54 fastened to the frame of the machine. The paddles 51 are further connected to the links 52 by springs 55, so that when an article presses against the article on the article support 10 which is resting against the paddles 51 it must overcome the tension in the springs to advance the article onto the discharge conveyor. In this way the sliced articles are transferred singly and progressively to the discharge conveyor without displacement of any of the slices due to tipping or falling from the heel-sliver dispenser plate and the flights of the discharge conveyor may contact them and advance them in an orderly fashion.

This mechanism is made adjustable so that it may be capable of handling sliced articles having varying heights and lengths. The arms 52 are adjustable vertically by means of the slots 56 and may be held in the desired position by bolts 57 and wing nuts 58 which clamp the arms 52 to the cross-piece 53. Intermediate the arms 52 and the cross-piece 53 is a horizontally slidable plate member 59 to provide for horizontal movement of the arms 52 brought about by moving the bolts 57 in slots 60 of the cross-piece 53. The cross-piece 53 is also vertically adjustable, by reason of the slots 61 in the supports 54, and the cross-piece may be held in any desired position by bolts 62 and wing nuts 63 which clamp the cross-piece to the support.

To provide a cushioned stop for the pivoted paddle, a resilient pad 64 may be provided at the upper end of the paddle, secured thereto in any suitable way, as, for example, by the rivet 65.

The blade guide mechanism 8 comprises an upper element 39 and a lower element 40 of suitable material, preferably non-metallic. Within the blade guide elements are a plurality of slots 41 corresponding in number to the number of blades 3 and each slot being of appreciably greater width than the thickness of the blade. The blade guide elements 39 and 40 are superposed and secured together by suitable bolts 42 which extend through the blade guide elements into a plurality of metal binding members or key lugs 43. The bolts 42 pass through apertures 44 in the blade guide elements 39 and 40, the aperture in the lower guide element 40 being in the shape of an elongated slot to provide for relative adjustment between the slots of the blade guide elements.

When the blade guide elements 39 and 40 are assembled to the machine in association with the blades 3 one side wall of each slot 41 is disposed substantially in engagement with one side of the corresponding blades 3, whereas the opposite side wall of the corresponding slot 41 of the other element is disposed substantially in engagement with the other side of the corresponding blade 3. Then the elements 39 and 40 are adjusted relative to each other to obtain the proper degree of engagement of the side walls 41 with the blade 3. In practice the blades 3 should engage the slot side walls with a sliding or running fit but not to such an extent to cause bending or binding of the blade. By having the blades in running engagement with one element at one side and with the other element at the opposite side, any desired degree of pressure can be obtained to insure that the blades will be efficiently guided.

To mount the assembled blade guide elements 39 and 40 in the holding member 16 the assembly is disposed in substantially the same horizontal plane as the holding member and in a position where the key lugs 43 mate with the spaces between the locking lugs 20 on the shelf 19. The blade guide elements are then moved in a direction toward the holding member and subsequently in a direction transversely of the holding member so that the key lugs 43 are in a position directly behind the locking lugs 20. Now the blade guide elements are frictionally engaged between the lower surface of the article support 9 and the upper surface of the shelf 19 and this frictional engagement is sufficient to retain the blade guide elements and prevent endwise movement thereof.

The operation of the pivoted holding member and its associated mechanism will now be described. When it is desired to change the blade frame in order to obtain a different slice thickness during the slicing operation the machine is shut down and the transfer table 5 is swung out of position by means of the handle 7 to the position shown in broken line in Fig. 2. Then the pivoted holding member is rotated in a counter-clockwise direction as looking at Fig. 2 from the position indicated in full lines to the position indicated in broken lines by means of the suitable handle or wrench 26. In this position the space adjacent the blades is free and unobstructed so that the blade frame 2 may be easily removed and a different blade frame substituted having the desired blade spacing. It may be seen that, while the holding member is in its uplifted position, the blade guides may be replaced by a different blade guide having slots to correspond to the new blade spacing, so that when the holding member 16 and the transfer table 5 are pivoted back to their normal position the machine is ready to be used.

In the slicing of bread and other bakery products it is desirable that the small heel slivers and crumbs which are formed due to the slight irregularities of the article being sliced be removed from the slicing mechanism. This removal may be accomplished by the mechanism shown in Figs. 1, 2 and 6, which operates substantially as follows:

After the article has been sliced by the blades 3 the individual slices are held together by means of side guides 46. The side guides 46 comprise flat plates disposed edgewise and are arranged at the side of the path of the loaf so that they engage the heels of the loaf just sliced with an engagement which holds the slices together without pressing them sufficiently to injure them in any way. A plurality of flat leaf spring members 47 are disposed on the inner face of the side guides 46 to afford a spring action against the end of the loaf. In this way should a loaf pass through the slicing mechanism which is slightly longer or has bumps at the end of the loaf, the spring members will be depressed rather than causing the slices of the loaf to be unduly pressed together. The plate 10 is disposed in the path of the sliced article at the rearward end of the slicing mechanism and is of a length substantially that of an average loaf, so that when the loaf passes over the plate 10 there will be a small space between the end of the loaf and the side guides through which heel slivers may drop below the normal plane of the loaf to a suitable container (not shown). Also, crumbs and the like from the mid portion of the loaf may be disposed of at the end of the plate 10 between the plate 10 and the discharge conveyor. Suitable side guides 48 may be provided on the conveyor to hold the slices of the loaf together during passage over the conveyor. These side guides 48 may be attached to the side guides 46 by means of suitable bolts 49 and wing nuts 50.

Obviously, if a change in the length of loaf to be sliced is made, it is desirable that the plate 10 be replaced by a similar plate having a length substantially that of the loaf to be sliced.

A modification of the blade guide mechanism is shown in Fig. 10 and it differs from that previously described in that the blade guide elements are pivotally mounted on opposite sides of the blades and may be actuated by a single mechanism. An upper blade guide element 66 is mounted in a holding bracket 67, which may be secured to or integral with the transfer table 5, and a lower blade guide element 68 is mounted in a holding member 70 secured to or integral with the article support 9. The elements 66 and 68 cooperate to guide the blades in a manner previously described in connection with the construction shown in Figs. 2 to 5.

To actuate the blade guide elements by a single mechanism, a lever 71, having a handle 72, is provided to rotate the table 5 about the pivot 6 and this lever 71 is extended beyond the pivot where it is pivotally connected to one end of a link 73, the other end of the link being pivotally connected to a lever 74 which is rigidly secured to the pivotally mounted holding member 70. Accordingly, when the handle 72 and the lever 71 are moved in a clockwise direction to the position shown in broken outline in Fig. 10, the blade guide elements are both rotated upwardly to the positions shown in broken outline, where they will not interfere with a change in blade frames.

In the construction shown in Fig. 10 the method of inserting and retaining the blade guide elements may be of the "bayonet type," as shown and described above in the application, in connection with the construction shown in Fig. 2 et seq.

It may be seen that the location of the blade guide elements may be changed as desired. It may be in some instances desirable to place the blade guides above the path of the article to be sliced, rather than below said path. The operation of the guides in such position is substantially the same.

It is also seen that the mechanism described above may be readily adapted for use with various slicing machines. A slicing machine equipped with or embodying the present invention will be found advantageous, since the user is enabled to slice a variety of bakery articles of varying dimensions, on one machine with each type of article having the desired slice thickness.

This invention gives added adaptability to a slicing machine without injuring the operation thereof. The change of blade frames to give a plurality of slice thicknesses may be accomplished quickly and easily.

It is to be understood that variations and modifications of the specific devices herein shown and described for purposes of illustration may be made without departing from the spirit of this invention.

What I claim is:

1. In a slicing machine, a plurality of spaced cutters, guide means for the cutters, said guide means comprising a plurality of elements having spaced fingers disposable between the cutters, said elements being carried by a common binding member, a support for the guide means, fastening means for securing the guide means to the support, said fastening means arranged so that the guide means are secured to and removed from the support by lateral movement of the guide means, and means for simultaneously pivoting all the fingers of the guide means from between the spaced cutters whereby the cutters may be readily removed from the machine.

2. In a slicing machine, a plurality of slicing blades, an article support along which articles may be advanced to and through the blades, a blade guiding device which comprises a support member disposed adjacent the blades in the region of the article support and having opposed substantially parallel portions, blade guiding elements adapted to be frictionally engaged and retained between said parallel portions and provided with spaced fingers disposable between the blades, intermittent rib portions positioned on one of the parallel portions of said support member, intermittent rib portions on said guiding elements, means for positioning the rib portions of said guiding elements between the rib portions of said support member, and means for moving the guiding elements with respect to said support member to dispose the rib portions thereof behind the rib portions of said support member.

3. A blade guiding device which comprises a support member pivotally mounted adjacent the blades having a pair of opposed substantially parallel surfaces open at the side nearest the blades, rib portions disposed on one of said parallel surfaces near the free edge thereof, superposed guide elements having portions disposable between the blades, rib portions to which the guide elements may be secured and means for mounting and retaining the guide elements in the support member, which includes positioning the rib portions of the guide elements behind the rib portions of the support member and moving the guide elements laterally into the support member.

4. A blade guiding device which comprises a pair of support members disposed adjacent the blades each having two opposed substantially parallel surfaces open toward each side of the blades, guide elements having portions disposable between the blades and being retained in their respective support members by frictional engagement with said parallel surfaces and by rib portions of the guide elements positioned behind rib portions disposed on said parallel surfaces of the support members, and means for moving the support members simultaneously to remove the guide elements from between the blades, whereby the guide elements may be laterally moved for removal from the support members.

ARTHUR A. KOTTMANN.